March 27, 1962 O. WEBB, JR 3,027,242
CONCENTRIC INJECTOR FOR CIRCULATING TUBE REACTOR
Filed Oct. 6, 1958 3 Sheets-Sheet 1

INVENTOR.
Orlando Webb, Jr.
BY
ATTORNEY.

INVENTOR.
Orlando Webb, Jr.

United States Patent Office 3,027,242
Patented Mar. 27, 1962

3,027,242
CONCENTRIC INJECTOR FOR CIRCULATING
TUBE REACTOR
Orlando Webb, Jr., Prairie Village, Kans., assignor to
Stratford Engineering Corporation, Kansas City, Mo.,
a corporation of Delaware
Filed Oct. 6, 1958, Ser. No. 765,449
13 Claims. (Cl. 23—285)

This invention relates to methods of and apparatus for performing chemical reactions and processes and refers more particularly to such methods and apparatus wherein reaction components are passed into a circulating mass of reaction product or other compounds to initiate the reaction or process while the temperature of at least one of the reaction components is controlled at a level different from that of the circulating mass until mixed therewith. Further, the invention relates to a concentric feed tube arrangement designed to maintain a temperature differential between one of the incoming feed streams and a circulating mass within a reaction vessel.

Many chemical reactants are markedly exothermic or endothermic and it is desirable to control such temperature changes as much as possible in the presence of the reaction product and reaction itself to avoid formation of undesirable by-products, side reactions and deterioration of the quality of the reaction product. In conventional methods and apparatus designed to accomplish this purpose, a closed, cyclic, flowing stream of fluids or fluids and finely divided solids, including reaction product, may be established in a reaction vessel axially of a circulating tube therein. Such a stream passes through the circulating tube and then around its exterior surface at a flow rate greater than the flow rate of the input of reactants to the vessel. Heat exchanging means generally are provided, but not always, within the vessel, to maintain the circulating volume of fluids at any desired temperature. The tempered blend is withdrawn from the closed, cyclic, flowing stream at a rate less than the flow rate of said stream. Impelling means are provided within the vessel and generally within the circulating tube to provide the motive force for circulating the blend within the vessel.

Typical apparatus and methods for controlling the temperature change of blends of fluids or fluids and finely divided solids as described are found in the application of David H. Putney, Serial No. 434,638, filed June 4, 1954, now Patent No. 2,800,307, and entitled "Method and Apparatus for Controlling the Temperautre Change of Blends of Fluids or Fluids and Finely Divided Solids." The present invention is an improvement over said application.

In the Pechiney process of forming urea from ammonia and carbon dioxide with the intermediate production of ammonium carbamate after the initial reaction, urea is the material remaining after the carbamate is stripped from the system, while excess mineral oil, ammonia and carbon dioxide are passed to a secondary circulating vessel to there form more carbamate, which is then passed in recycle to the original reaction step for transformation to urea. A severe problem exists in attempting to pass the ammonia and carbon dioxide gases into the second reaction vessel without encountering too early crystallization of the carbamate with resultant plugging of feed flow lines, inlet nozzles and general fouling of the system. Additionally, conventional methods and apparatus cause the formation of too large crystals in the secondary vessel.

In the alkylation of isoparaffins with olefinic hydrocarbons in the presence of an acid catalyst, it is eminently desirable to maintain the olefinic hydrocarbons at the lowest possible temperature before contacting them with either the acid or the isoparaffinic hydrocarbons. By so maintaining the olefins at a low temperature, many advantages are acheived in the akylation process, such as better yield, less side reactions and less polymerization. Present methods and apparatus not only do not maintain as low an olefin temperature desired but fail to disperse the olefins and acid in the reaction mixture as completely and uniformly as desired.

Many other chemical reactions, in addition to the above two, are performable by a dispersion of reactants in a circulating reaction mixture, as previously described, it being eminently advantageous to protect the temperature differential of at least one of the input feed reactants relative the higher or lower temperature of the circulating mass in the reaction vessel as long as possible for certain advantages either to the reaction product, the reaction itself, or the protected reactant of the other reactants. Complete, high speed, uniform, simultaneous dispersion of the reactants in the circulating mass is also much to be desired. These two properties are not found in the degree desired in existing methods and apparatus for performing chemical reactions and processes.

Therefore, an object of the invention is to provide both methods and apparatus for adequately and completely controlling the temperature change of a blend of fluids or fluids and finely divided solids while simultaneously providing for separate temperature control of a reactant feed input into the blend even though said reactant feed input may be at a large temperature differential from the blend itself.

Another object of the invention is to provide methods and apparatus for feeding reactant inputs into a circulating mass of reaction product and the like for reaction therein wherein the reactant feeds are concentric to one another, thereby providing not only protection for one of the reactant feeds from the existing temperature within the reaction product stream but also simultaneous, juxtaposed dispersion of the reactant feed inputs within the circulating reaction stream.

Still another object of the invention is to provide methods and apparatus for separately controlling the temperature changes and temperature of a blend of fluids or fluids and finely divided solids as well as the reactant feed inputs into the blend although the said temperatures may differ greatly one from the other.

Another object of the invention is to provide methods and apparatus for passing ammonia and carbon dioxide, as well as carrier mineral oil, into a slurry of ammonium carbamate crystals circulating in a reaction vessel, the slurry at a temperature below the crystallization temperature of the mixed ammonia and carbon dioxide, yet the methods and apparatus providing for complete and adequate dispersion of the gases in the slurry without clogging of the feed lines or reaction of the gases before said dispersion.

Another object of the invention is to provide methods and apparatus for the alkylation of isoparaffinic hydrocarbons with olefinic hydrocarbons in the presence of an acid catalyst wherein the olefinic hydrocarbons are maintained at a lower temperature than the circulating alkylate and excess isoparaffinic hydrocarbons in a reaction vessel until the very moment of dispersion of the olefins in said circulating mixture.

Yet another object of the invention is to provide a reaction vessel and circulating apparatus for both controlling the temperature change of chemical reactions within the vessel and providing for the maintenance of the temperature of at least one of the reactant inputs to the vessel at a marked differential from the temperature of the circulating reaction product in the vessel, the latter feature accomplished without interfering with the process of the reaction or the maintenance of the desired reaction temperature, the vessel and apparatus, as well, providing extremely complete and adequate simultaneous dispersion of the reactant feeds into the circulating reaction product mixture.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIGS. 3 and 4 show the inventive method and apparatus as applied in the manufacture of urea and the alkylation of isoparaffinic hydrocarbons with olefinic hydrocarbons, respectively. FIGS. 1 and 2 show mixing vessels adaptable for use in either or both of the processes and will be first described.

Figure 1:
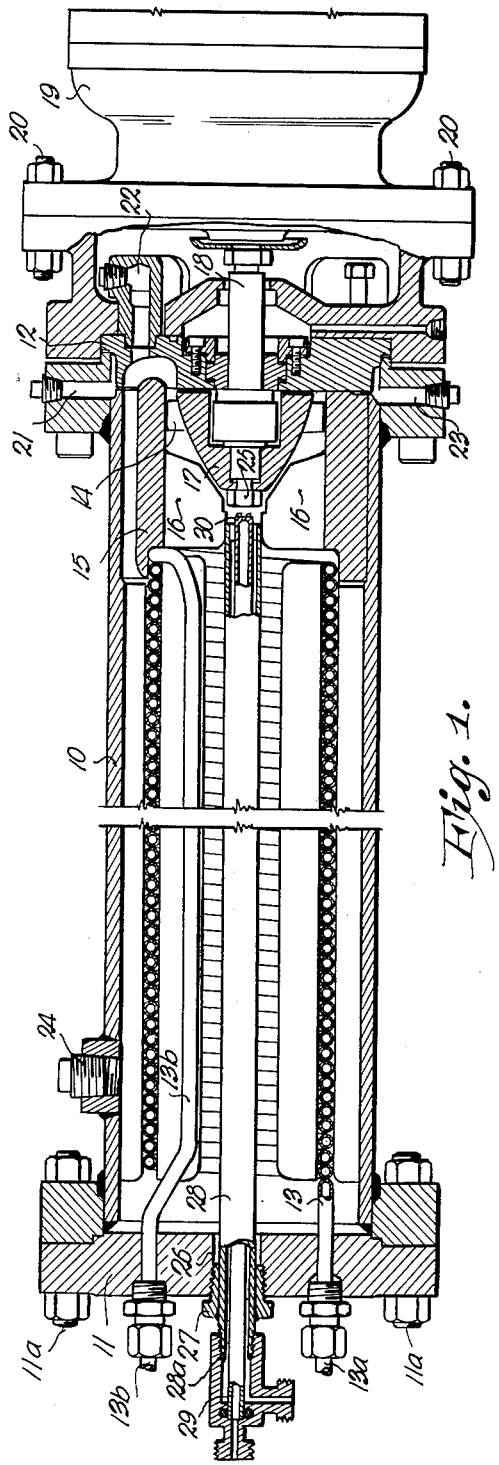
FIG. 1 is a side-sectional view of one type of reaction vessel for the employment of the inventive process.

Referring to FIG. 1, the reaction vessel there shown comprises an outer shell 10 closed at one end by plate 11 and bolts 11a and at the other end by hydraulic pumping head 12. A circulation tube 13 is formed of a tightly coiled pipe and extends a portion of the length of the housing 10 to define a circulation path for fluids in the vessel centrally down the circulation tube and out around between its periphery and the inner wall of the reaction vessel. The pipe comprising circulation tube 13 serves as a heat exchanging element in the reaction vessel and has heat exchanging medium input connection 13a and output connection 13b from the far end of the circulating tube. Connections 13a and 13b are sealingly received in plate 11 and extend therethrough. Circulating tube 13 is open at both ends for free communication with the space within the outer shell. A pumping impeller 14 is located in one end of the reaction vessel at the end opposite from plate 11. Secondary circulating tube 15 acts as an extension of circulating tube 13 and the impeller 14 is positioned within one end thereof. Straightening vanes 16 are fixed at their outer ends to the secondary circulating tube and extend inwardly adjacent the mounting cone 17 of the impeller which is driven by shaft 18 connected to power source or motor 19, the latter rigidly fixed by bolts 20 relative the reaction vessel. Product outlets 21, 22 and 23 are provided to be used as desired or necessary, determined by the nature of the product and process being practiced in the vessel. Additional outlet 24 is also provided. Nut 25 locks shaft 18 to impeller carrying cap 17 and has a flat outer surface.

Centrally of plate 11 is provided opening 26. Mounting nut 27 is threaded into opening 26 and sealingly receives outer feed pipe 28. Pipe 28 extends the length of the circulating tube 13 to a position closely adjacent nut 25 on shaft 18. Pipe 28 preferably is centrally positioned within the reaction vessel and the circulating tube 13, as well as secondary circulating tube 15. Secondary feed inlet line or tube 29 is concentrically positioned within primary feed inlet pipe or tube 28 and extends therewithin to a like position adjacent the nut 25 and preferably, though optionally, has nozzle 30 at the end thereof directed at the flat face of nut 25. The tubes 28 and 29 are arranged to discharge feed fluids or finely divided solids concentrically against the nut 25 whereby the feeds will be highly dispersed in the area peripheral thereto. Appropriate conventional fittings of T-type or the like may be threaded on the threaded portion 28a of inner tube 28 to provide feeds to the two feed inlet tubes.

The impeller is arranged for taking suction from the circulating tubes 13 and 15 and discharging into the hydraulic head 12, where the flow of fluids is reversed and directed into the annular space between the outer shell and the circulating tubes 15 and 13. If the reaction vessel of FIG. 1 is employed as a vertical one with the motor 19 at the lower end, the machine may be drained through channel 22, if desired. Heat exchanging fluid may be input through line 13a to coil 13 and withdrawn through line 13b. Plate 11 may be disconnected from shell 10 by removing the bolts 11a and the entire feed tube assembly and heat exchanging circulating tube 13 may be pulled out and away with the plate 11. Likewise, by removing bolts 20 and the shaft 18 connection, the motor 19 may be withdrawn from the reaction vessel assembly.

Figure 2:
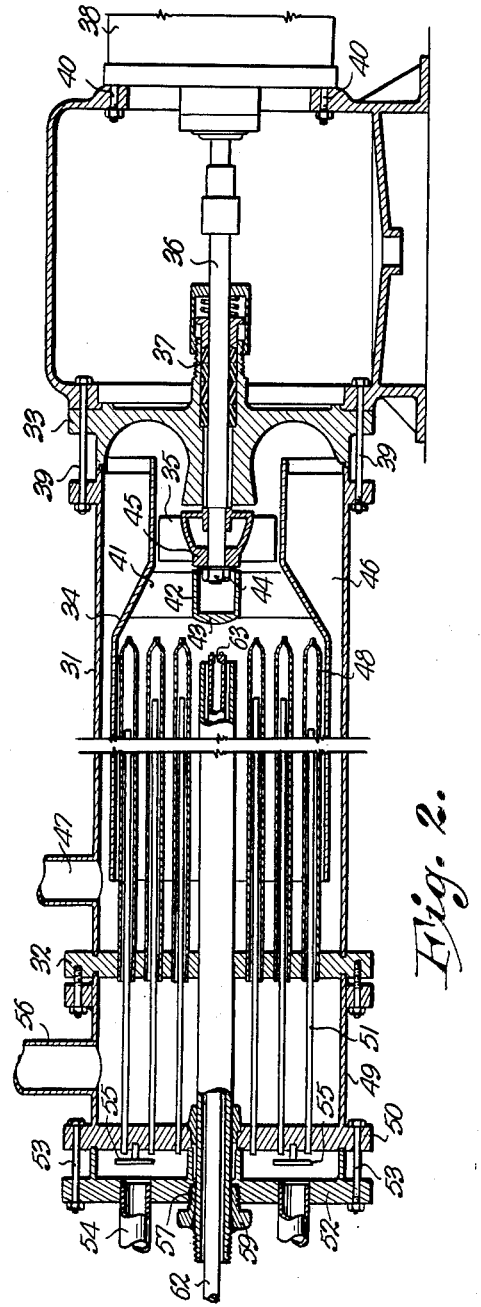
FIG. 2 is a side-sectional view of a second form of reaction vessel operable for the practice of the inventive method therein.

Referring now to FIG. 2, therein shown a modified reaction vessel wherein may be performed the same processes as those contemplated for the FIG. 1 vessel. This tubular reaction vessel and heat exchanger comprises an outer shell 31 closed at one end by a tube sheet 32 and at the other end by a hydraulic pumping head 33. Within the outer shell 31 is a circulating tube 34 open at both ends for free communication with the space within the outer shell. A pumping impeller 35 is mounted on shaft 36 which extends through and is received in bearing 37 and is driven by motor 38. Motor 38 is rigidly fixed relative the reaction vessel by bolts 39 and 40. Various conventional assemblies relative the shaft 36 and the motor mounting have been omitted in the view for simplicity. Straightening vanes 41 are fixed to the inside surface of the circulating tube 34 and carry central cap 42 having slightly rounded end surface 43 to receive and cover the nut 44 fixing the impeller cap 45 on shaft 36. Other straightening vanes 46 space the circulating tube 34 from the shell 31. Product drain opening 47 may be positioned anywhere desired on the shell 31.

In this modification of the reaction vessel, a so-called lance-type tube bundle is employed. Heat exchange tubes 48 are closed at their ends opposite tube sheet 32. Channel 49 has additional tube sheet 50 dividing its length into two separated volumes. Into tube sheet 50 are fixed open end tubes 51. Tubes 51 are equal in number and spacing to the heat exchange tubes 48 but are smaller in diameter. The open ended tubes 51 are arranged to extend into the closed ended tubes 48, terminating a short distance from the closed ends thereof. The function of tubes 51 is to conduct heating or cooling medium to the ends of closed end tubes 48 and discharge it into the closed end tubes so it will flow back through the annular space between the closed and open ended tubes. Channel 49 is closed by plate 52 which is fixed to the tube sheet 50 by bolts 53. Heat exchanging medium inlet pipes 54 pass the medium into the open ended tubes 51 deflected by baffles 55, while heat exchanging medium outlet 56 takes the medium after passage through the tubes out of the channel 49. Openings 57 and 58 are formed through plates 52 and 50, respectively, preferably centrally thereof. Sealing nut 59 and wedge piece 60 seal the outer concentric feed tube 61 through these two plates. Tube 61 extends centrally of the heat exchanging tube bank into the circulating tube 34 closely adjacent the curved surface 43 of cap 42. Secondary feed tube 62 is positioned concentrically within tube 61 and extends to approximately the same point in the circulating tube 34. Nozzle 63 may optionally be positioned at the free end thereof. Both of the tubes 61 and 62 are preferably so positioned as to discharge any feed components against the center of the curved surface 43 of the cap 42.

In this type of apparatus, as in that previously described, the impeller 35 picks up the components introduced through nozzles 61 and 63 and causes them to circulate as blend through the annular space between the outer shell 31 and the circulating tube 34. At the tube sheet end of the vessel, the travel of the flowing stream is reversed and the blend or mixture caused to pass through the interior of the circulating tube, at the same time being brought in heat exchanging relationship with the heat exchange elements 48.

Referring to both the showings of FIGS. 1 and 2, it will be understood that suitable connections are made to pipes 28, 29 and 61 and 62, and valves are provided to control the quantity of feed input elements introduced into the vessel. Suitable sources of supply are also provided and suitable pipe connections thereto. Additionally, connections are made to heat exchange inputs 13b and 54 and outlets 13a and 56 and valves are provided to control the circulation of the heat exchanging medium to the vessels in desired quantities and at proper circulating rates. The temperature of the heat exchanging medium is governed according to the requirements of the particular fluid which is being tempered. A discharge pipe is in each case connected to outlets 21, 22, 23, 24 or 47 equipped with suitable valves to drain off the fluids when desired.

Obviously, other forms of heat exchanging apparatus may be used without altering the concept and functions hereinbefore explained. For example, heat exchange elements can be installed in the annular space between the circulating tubes and the outer shells of the exchangers. Also, the outer shell may be jacketed for the circulation of heating or cooling medium between the jacket and outer shell to supplement or replace the tubular or coil elements shown. The circulating tubes 15 and 34 may likewise be jacketed to give a double wall construction for the circulation of heat transfer fluid therebetween, thus providing a heat exchange medium within the body of the circulating stream.

It is also contemplated that the direction of flow of the liquids may be reversed, either by changing the pitch of the impeller or its direction of rotation. In other words, the apparatus contemplates any arrangement of heat exchanging surface in a vessel together with pumping means for establishing a closed cycle internal flow over that surface greater than the flow of fluids into or out of the exchanger. It also contemplates optionally the complete absence of any sort of heat exchanging apparatus in the vessel such as the removal of the coil 13 from the FIG. 1 modification and the substitution of a circulating tube comprising an extension of the secondary tube 15 therefor or the complete omission of the tube elements 48 and 51 from the apparatus of FIG. 2.

Figure 3:
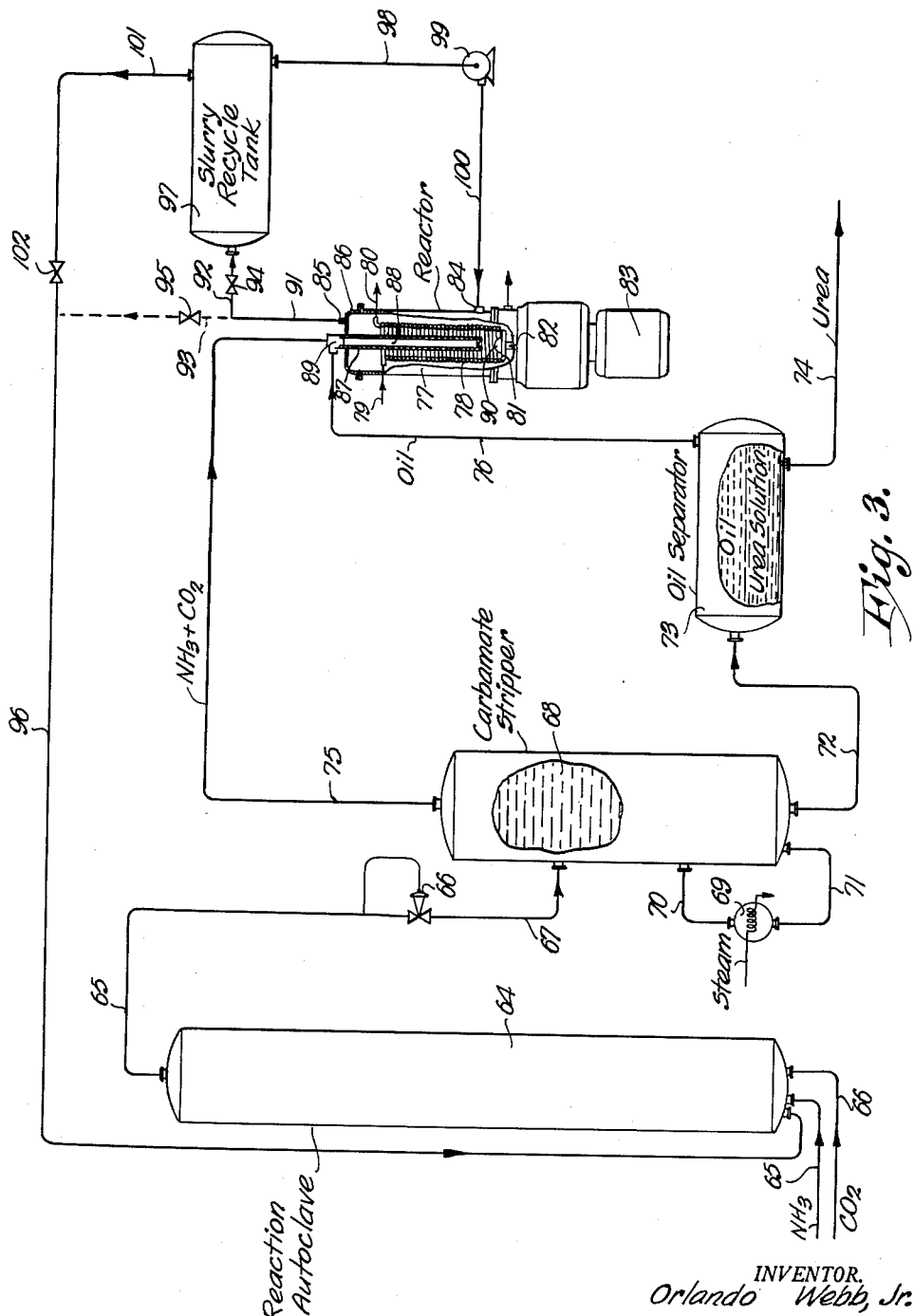
FIG. 3 is a schematic flow diagram of a process for the production of urea from ammonia and carbon dioxide, the apparatus of FIG. 1 appearing as one of the parts of the schematic diagram.

Turning now to FIG. 3, therein is shown a schematic flow diagram for a process of urea manufacture wherein the inventive concentric feed method, as well as the inventive apparatus are employed. The urea process will be sequentially described and the application of the inventive method and apparatus therewith.

Reaction autoclave 64 is fed by flow lines 65 and 66 carrying ammonia and carbon dioxide, respectively. In the autoclave, at approximately 3,000 pounds per square inch, the following reaction takes place:

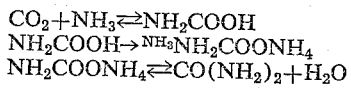

Withdrawal line 65 from the top of autoclave 64 carries, in a mineral oil media, excess ammonia, ammonium carbamate and urea solution. Pressure is reduced at valve 66 and flow line 67 carries this mixture to carbamate stripper 68 where the pressure is maintained at about sixty pounds per square inch. A reboiler on stripper 68 has heat exchanger 69 with input and output lines 70 and 71 thereto and therefrom. The urea and mineral oil are taken off the bottom of carbamate stripper 68 by line 72 and passed to oil separator 73. Urea solution is taken off the bottom of separator 73 through line 74. Ammonia and carbon dioxide gas in mixture are taken off the top of the stripper by line 75. This mixed fluid is at approximately sixty pounds per square inch and 210° F. Mineral oil is taken off the top of oil separator 73 through line 76, likewise at about sixty pounds per square inch and 210° F.

At 77 is shown the shell of a reactor equivalent to that shown in FIG. 1 having circulating tube 78 formed of a tightly coiled heat exchanging pipe or tube with heat exchanging medium input 79 and output 80. Impeller 81 is mounted on shaft 82 driven by motor 83. Recycle input line fitting 84 is positioned in one side of the shell 77 and output slurry fitting 85 penetrates the end plate 86. Extending concentrically down the center of the shell 77 and circulating tube heat exchanger 78 are feed input tubes 87 (outer) and 88 (inner). T fitting 89 passes the hot mineral oil down the outer feed tube or pipe 87 circumferential to inner pipe 88 which receives the ammonia and carbon dioxide gas mixture. The mineral oil is discharged into the recycling slurry within the reactor shell 77 peripherally to the gas, both of which impinge on the impeller cap 90. This process will be described in greater detail later.

Withdrawal line 91 takes the slurry of mineral oil containing solid ammonium carbamate crystals and passes it optionally to line 92 or line 93, controlled by valves 94 or 95, respectively. The preferred flow with the inventive system passes the slurry into line 93 with valve 95 open and valve 94 closed and thence to recycle line 96 which returns to reaction autoclave 64 the mineral oil slurry containing solid ammonium carbamate crystals for further urea formation.

Alternatively, valve 95 may be closed and valve 94 open. With this arrangement the mineral oil slurry containing solid ammonium carbamate crystals from the reactor 77 passes through line 92 and valve 94 to slurry recycle tank 97. Recycle line 98 passes to pump 99 and thence through line 100 into the recycle fitting 84 in the shell. Excess slurry of oil and crystals is taken off the top of tank 97 through line 101 through valve 102 and into the recycle line 96 to the autoclave.

It is well known that solid ammonium carbamate forms if the mixture of carbon dioxide and ammonia gas in line 75 drops below 167° F. at the pressure involved (sixty pounds per square inch). By feeding the mineral oil peripherally to the line carrying the gas into the vessel 77 (where the recycling slurry around and through the circulating tube is at a temperature less than 167° F.), crystal formation is avoided until the actual discharge of the gas from the nozzle at the end of tube 88 against the hub 90 of the impeller 81 surrounded by a screen or mineral oil. (The oil is not above 167° F.). By keeping the gas hot until it is dispersed through the jet nozzle shrouded by a screen of oil, uniform dispersion of the gas in the recycle slurry and intimate mixing thereof by the immediate contact with the impeller 81 is achieved. The spray of oil and gas is sheared into drops, and crystals are formed of relatively small size on the surfaces of the liquid oil drops. The internal recycle slurry within the reactor is of the order of 40,000 gallons per minute while the input of oil and gas is of the order of 200 gallons per minute. Thus it is seen that, without the concentric oil feed, a severe temperature drop would be experienced by the gas within an unshielded tube feed input to the vicinity of the impeller 81 which traversed any large extent of the reaction vessel itself. By the arrangement shown, crystal formation is avoided until actual dispersion in the slurry, uniform circumferential dispersion around the hub and into the impeller of both the oil and gas is achieved, immediate shearing and breaking up of the feeds is accomplished and small crystal size is achieved.

Figure 4:
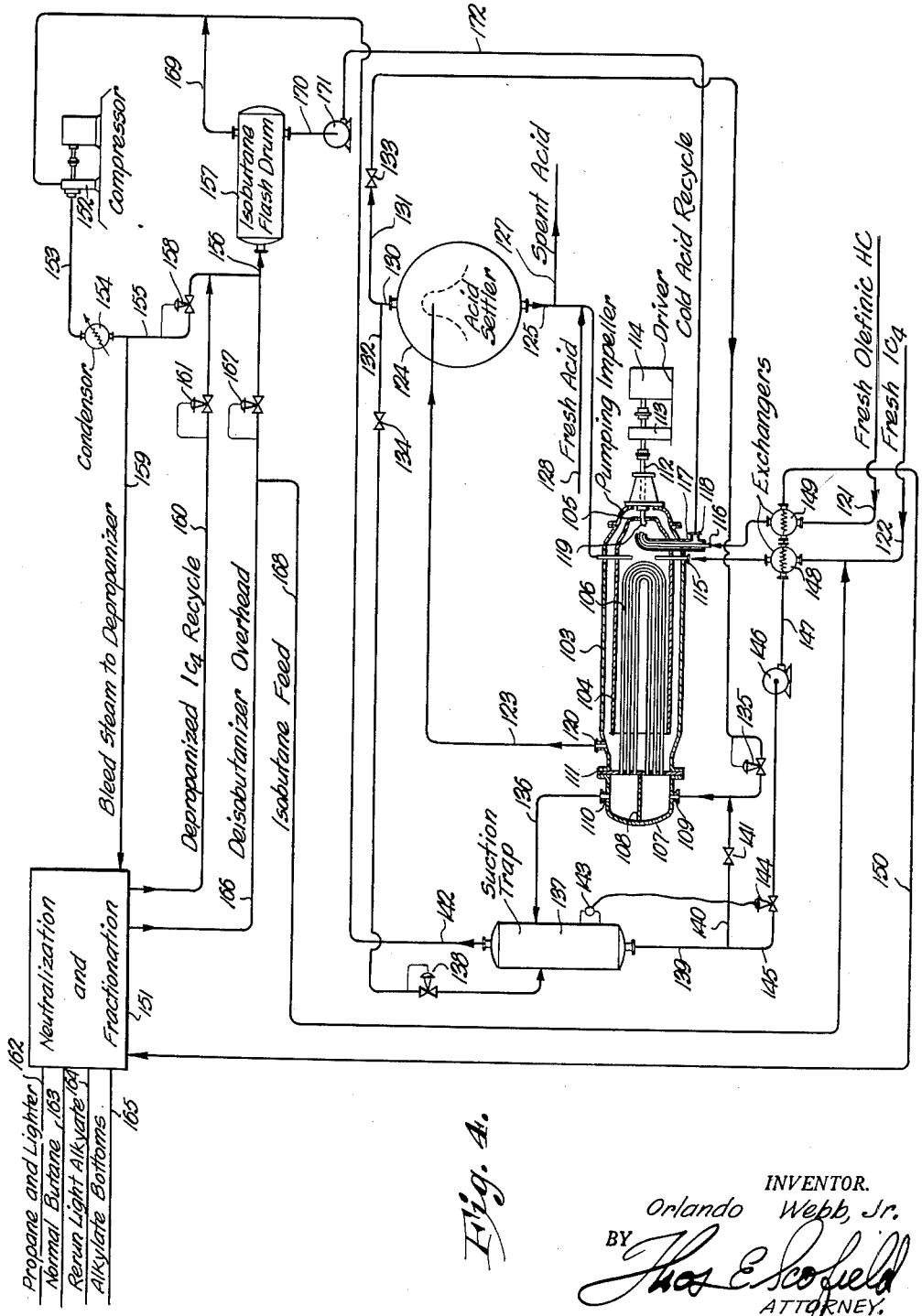
FIG. 4 is a schematic flow diagram of a process of alkylation of isoparaffinic hydrocarbons with olefinic hydrocarbons in the presence of acid catalyst, the process employing effluent refrigeration.

Turning now to FIG. 4, therein is shown the inventive method as applied in a system for the alkylation of isoparaffinic hydrocarbons with olefinic hydrocarbons in the presence of an acid catalyst, the process being carried out in yet a third modification of a reaction vessel. At 103 is shown the shell of a reactor equipped with an open ended circulating tube 104. At one end of the circulating tube is an impeller 105 which serves the purpose of a circulating pump in cooperation with the circulating tube. Within the circulating tube 104 are a plurality of heat exchange elements 106 comprising a tube bundle provided with a distributing head 107 enclosing one end of the reactor. Distributing head has baffle 108 dividing the volume thereof into two parts with input connection 109 to one part and output connection 110 from the other. Heat exchanging medium entering fitting 109 passes into the tube bundles (which are rolled into the tube sheet 111 closing off one end of the shell 103) and then out of the other ends of the U-bends on the other side of the baffle 108 and out the fitting 110. Impeller 105 is mounted on a shaft 112 rotated through a reduction gear 113 by any suitable source of power or prime mover such as an electric motor or steam turbine diagrammatically shown at 114.

Circulation within the reactor is established by the impeller through the annular space between the shell 103 and circulating tube 104 around the cooling or heat exchange tubes 106 and back to the impeller. The reaction can also be accomplished in a vessel without heat exchange elements with the heat exchange step in a subsequent operation. Input line 115 penetrates and is sealed through shell 103 and circulating tube 104. Input line 116 is sealingly received in a fitting on concentric feed tube 117 having input fitting 118. Recycle acid input line 115 penetrates and is sealed through shell 103 and circulating tube 104. Tubes 116 and 117 extend through and are sealed through the shell and circulating tube 103 and 104 and turn at an angle to discharge against the rounded hub 119 of the impeller 105. Output fitting 120 takes off fluids from the shell 103 at any desired point therealong.

Olefinic hydrocarbons are introduced in line 121 and passed to input line 116. Fresh isoparaffinic hydrocarbons and isobutane in excess are introduced to the system through line 122 joining input line 115. Chilled hydrocarbon at about 20° F. from the isobutane flash drum is input to the fitting 118 to pass through input flow line 117 from sources to be described. The olefinic hydrocarbons are thus protected from contact from both the isoparaffinic hydrocarbons or the acid until they are discharged into the cyclic flowing stream within the circulating tube. This process will be described in more detail later. At any rate, the acid and olefinic hydrocarbon streams are dispersed in the circulating mass of reaction product and excess isobutane against the impeller hub 119 and immediately highly mixed by impeller 105. Alkylation of the isoparaffinic hydrocarbons by the olefinic hydrocarbons takes place in the reactor while the mixture is being rapidly circulated and agitated by the impeller 105 which assures mixing of the hydrocarbons and acid catalyst.

The effluent mixture of hydrocarbons and acid is discharged from the reactor through fitting 120 and line 123, passing first to the primary acid settler 124 where it is permitted to separate into a hydrocarbon phase and an acid phase. The acid phase is withdrawn from the bottom of the settler 124 and is either returned to the reactor through pipes 125 and 126 or diverted through pipe 127 to an acid regenerator (not shown). Fresh acid may be added through line 128 to the system and recycle and fresh acid may be passed through line 129 to input flow line 115.

The hydrocarbon phase separated in the acid settler 124 is discharged from the pipe through line 130 and may be directed either through line 131 or line 132 by manipulation of the valves 133 or 134 in these lines. If directed through line 131, pressure is reduced at pressure reduction valve 135, resulting in vaporization of a portion of the isobutane component and chilling the material, after which at least a portion of the liquid-vapor mixture at greatly increased velocity is directed to the distributing head 107 of the reactor. The coolant introduced in fitting 109 passes through the heat exchange elements 106, thence to the opposite side of the distributing head and out through line 136 whence it passes to suction trap 137. Back pressure valve 135 is designed to hold sufficient back pressure on the reactor-settler system to prevent appreciable evaporation of the hydrocarbon components contained therein.

On the other hand, the hydrocarbon phase may be directed through line 132 from the acid settler 124, pressure reduced at valve 138 and the material chilled by evaporative cooling in flash drum or suction trap 137. Liquid from the suction trap may be drawn from the bottom thereof through line 139 and passed through line 140 and valve 141 to join line 131 after pressure reduction valve 135. Circulation of liquid through the cooling tubes 106 in such case is effected by the gas lift effect of the vapors evolved within the tubes. The hydrocarbon phase discharged through line 130 may be split and a portion passed through line 132 and the remainder through line 131 with the valves 133 and 134 controlling the relative amounts of these flows.

The description of the use of all or a portion of the hydrocarbon phase discharged from the acid settler 124 as cooling medium in the tube bundle are typical effluent refrigeration processes described in the patent to David H. Putney, No. 2,664,452, entitled "Process for Alkylation Utilizing Evaporative Cooling," issued December 29, 1953, and the application of David H. Putney, Serial No. 450,192, filed August 16, 1954, now Patent No. 2,949,494, entitled "Alkylation of Hydrocarbons Utilizing Evaporative Cooling." Such effluent refrigeration systems do not comprise a part of the instant invention and are merely shown and described to illustrate a typical process of alkylation of isoparaffinic hydrocarbons with olefinic hydrocarbons with heat exchanging of the recycling hydrocarbons and acid catalyst in a criculating reactor. The effluent refrigeration systems, as described, maintain the circulating fluids in the reaction vessel at a relatively low temperature but not as low a temperature as might optionally be desired for the olefinic hydrocarbons before the reaction with the isobutane in the alkylation process.

It is desired to disperse the olefinic hydrocarbons in the isobutane-rich recycling mixture in the reaction vessel at a temperature several degrees, at least, lower than the recycling fluids. This is achieved by jacketing the input pipe 116 for the olefinic hydrocarbons with the input pipe 117 feeding the chilled hydrocarbons from the isobutane flash drum 157 into the reaction vessel. By this process, the olefinic hydrocarbons are jetted against the impeller cap 119 within a screen of chilled isobutane which uniformly dispersed mixture is immediately highly mixed in the recycling stream of excess isobutane by the impeller 105 and whirled around the outside of the circulating tube 104.

If it is not desired to use an effluent refrigeration system in the manner described, the hydrocarbon phase from the settler 124 could be passed through a line equivalent to line 132 to a suction trap equivalent to 137 and from there the liquid drawoff from the suction trap as from line 139 could be passed directly to fractionation and the vapors withdrawn through line 142 (consisting largely of excess isoparaffinic hydrocarbons) could be condensed and/or compressed and recycled as feed to the reaction. In such latter case, two alternatives as to heat exchanging of the reaction vessel could be employed. In the first place, a closed cycle refrigeration system of conventional design could be employed with a tube bundle set up as shown in the reactor 103 wherein a closed cycle refrigerant would be put in through fitting 109 and taken out through fitting 110. In a closed cycle system, the temperature differential problem of keeping the olefins cool would still exist as it would be impossible to reduce the temperature of the circulating reaction mass economically to the desired input temperature of the olefins. Secondly, no heat exchanging whatever of the reaction vessel might be employed, in which case the olefin input temperature problem would be even more extreme.

As previously stated relative FIG. 4, upon leaving the cooling elements 106 of the reactor, the chilled and partly vaporized effluent passes from the opposite side of the circulating head through line 136 to suction trap 137 where the vapor and liquid portions of the effluent are separated. A liquid level control 143 manipulating valve 144 regulates the discharge of the liquid phase from the suction trap through lines 139 and 145. This liquid is returned by pump 146 through line 147 to heat exchangers 148 and 149 where it is brought in heat exchanging relationship with the incoming feed stocks of isobutane and olefinic hydrocarbons. From the heat exchangers, the liquid passes through line 150 to the neutralization and fractionation steps shown diagrammatically at 151.

The vapors separated from the effluent in suction trap 137 pass out through line 142 to compressor 152 from which they are discharged through line 153 to condenser 154 where they are totally condensed. A portion of the condensate from condenser 154 is directed through lines 155 and 156 to isobutane flash drum 157 which is operated at the same pressure as suction trap 137, both pressures being controlled by the suction pressure on compressor 152. Interposed in line 155 is pressure reducing valve 158 which holds sufficient back pressure on condenser 154 to make possible total condensation of the hydrocarbons at the temperature which can be attained with the available water supply. Liquid hydrocarbons passing through valve 158 are thereby reduced in pressure causing partial vaporization and chilling of the hydrocarbons prior to their introduction into flash drum 157.

When propane is a component of any of the feed streams, a portion of the condensate withdrawn through line 155 is diverted through pipe 159 to the depropanizer of the fractionation section 151. This is necessary in order to purge the system of the same amount of propane as is contained in the feed stocks and after depropanization this stream is returned to the system through line 160, pressure reducing valve 161 and pipes 155 and 156 to the isobutane flash drum 157.

The liquid hydrocarbons withdrawn from suction trap 137 and passed to fractionation are there separated into streams of propane 162, normal butane 163, light alkylate 164 and alkylate bottoms 165 which are removed from the system as shown. The isobutane stream taken overhead from the deisobutanizer tower (not shown) is recycled through line 166, reduction valve 167 and line 156 to the isobutane flash drum from which it is directed to the reaction stage. Fresh isobutane feed to the system may also be brought in either through line 122 (previously described) or through line 168 which connects with line 166. All of the streams entering the isobutane drum 157 are subjected to reduced pressure established by the suction of the compressor 152 and are thereby self-refrigerated. The vapors evolved in the isobutane flash drum by this self-refrigeration are passed through line 169 to the compressor 152, while the chilled liquid from the drum, principally isobutane, is directed through line 170 to pump 171 and thence through line 172 to the reactor.

In the alkylation system shown wherein the olefinic hydrocarbons are chilled and fed concentrically with chilled hydrocarbon the initial contact of the olefin is with the cold hydrocarbon at approximately 20° F. The olefin is better absorbed at a low temperature in the acid. With the arrangements shown, not only is this temperature differential maintained for the olefin relative the recycling fluids in the reactor vessel, independent of the heat exchanging system employed, or whether any heat exchanging system is employed within the reactor, and better yield, less side reactions, uniform dispersion of the acid and olefin relative one another and the circulating hydrocarbons in the vessel are achieved. Less polymerization of the olefins occurs. Immediate intimate mixing of the acid, olefin and recycle hydrocarbons is also provided. It may also be noted here that the alkylation system of FIG. 4 shows a relatively cold fluid protected against a relatively hot circulating mass. On the other hand, the urea system of FIG. 3 shows a relatively hot gaseous mixture protected against a relatively cold liquid slurry recycle in a reaction vessel. Thus it is evident that in the concentric feed method and apparatus, any desired temperature differential of the inner input feeds may be provided either positive or negative. Additionally, a jet nozzle may be employed in the end of pipe 116 in the alkylation system, if desired.

From the foregoing it will be seen that this invention is one well adapted to attain all of the ends and objects hereinabove set forth together with other advantages which are obvious and which are inherent to the method and apparatus.

It will be underestood that certain features and subcombinations are of utility and may be employed without reference to other features and sucombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described our invention, we claim:

1. In apparatus for controlling the temperature change of a blend of fluids or fluids and finely divided solids including an elongate casing having a discharge opening, a hollow open-ended circulating tube positioned axially within said casing and spaced from the interior wall thereof forming an annular passage therewith, an impeller adjacent one end of the circulating tube for creating a cyclic flow of fluids through said tube and in the annular space surrounding said tube, and a circulating head forming the end of the casing adjacent the impeller, the improvement which comprises a pair of feed tubes extending through the casing and into at least a portion of the circulating tube, the discharge ends of the feed tubes extending to a point adjacent the impeller, one of said feed tubes concentrically positioned to the other thereof substantially their entire extension within said casing.

2. Apparatus as in claim 1 wherein the concentric feed tubes extend axially of at least a portion of said circulating tube.

3. Apparatus as in claim 1 wherein the feed tubes extend axially of substantially the entire length of said circulating tube.

4. Apparatus as in claim 1 wherein the discharge ends of the feed tubes are positoined opposite the impeller hub whereby to discharge thereagainst and more completely disperse the fluids passed therethrough.

5. Apparatus as in claim 4 wherein the impeller hub is so formed as to provide an impinging surface against which the fluids from the feed tubes strike for more effective dispersion.

6. Apparatus as in claim 1 wherein the feed tubes penetrate the casing at a position opposite the impeller and extend axially of at least a portion of said circulating tube.

7. Apparatus as in claim 1 including heat exchanging means positioned within at least a portion of said circulating tube proper.

8. Apparatus as in claim 7 wherein the heat exchanging means itself at least substantially forms the circulating tube.

9. Apparatus as in claim 7 wherein the heat exchanging means comprises a tightly wound coil of pipe whose sections are so spaced relative to one another as to form a substantially solid surfaced circulating tube.

10. Apparatus as in claim 1 wherein the feed tubes end at the same position whereby the fluids therein cannot mix until they pass out of said feed tubes.

11. In apparatus for controlling the temperature change of a blend of fluids and finely divided solids including an elongate casing having a discharge opening, a hollow open-ended circulating tube positioned axially within said casing and spaced from the interior wall thereof forming an annular passage therewith, an impeller adjacent one end of the circulating tube for creating a cyclic flow of fluids through said tube and in the annular space surrounding said tube, a circulating head forming the end of the casing adjacent the impeller, a header at the other end of the casing, and a plurality of heat exchange tubes connected into said header, at least a substantial portion of said tubes extending axially of said casing into said circulating tube, the improvement which comprises a pair of feed tubes extending through the casing and into at least a portion of the circulating tube, the discharge ends of the feed tubes extending to a point adjacent the impeller, one of said feed tubes concentrically positioned to the other thereof substantially their entire extension within said casing.

12. Apparatus as in claim 11 wherein said heat exchanging tubes extending into said circulating tube comprise concentric tubes of different diameters having annular spaces therebetween, the tubes of larger diameter are each closed at one end thereof and connected at the open ends thereof into a heater at one end of the casing, the smaller tubes are open at both ends thereof, one end of each said small tube is connected to a separate header in the casing outboard of said first named header, the other end of each small tube extending substantially into one of said larger tubes, an inlet opening for heat exchanging medium is provided in the small tube header and an outlet opening for heat exchanging medium from the large tube header, and the concentric feed tubes extend axially of at least a portion of the circulating tube and axially of the heat exchanging tubes extending into said circulating tube.

13. Apparatus as in claim 12 wherein the feed tubes penetrate both said headers and are sealed therethrough.

References Cited in the file of this patent

UNITED STATES PATENTS

| | | |
|---|---|---|
| 1,907,455 | Stenzel | May 9, 1933 |
| 1,948,002 | Mittasch et al. | Feb. 20, 1934 |
| 2,194,082 | Booth | Mar. 19, 1940 |
| 2,238,802 | Altshuler et al. | Apr. 15, 1941 |
| 2,618,534 | Mrstik | Nov. 18, 1952 |
| 2,730,433 | Cartledge | Jan. 10, 1956 |
| 2,775,512 | Leithauser et al. | Dec. 25, 1956 |
| 2,800,307 | Putney | July 23, 1957 |
| 2,875,027 | Dye | Feb. 24, 1959 |